United States Patent
Laurint et al.

(10) Patent No.: US 8,160,305 B2
(45) Date of Patent: Apr. 17, 2012

(54) METHOD AND APPARATUS FOR MEASURING DEPOSITION OF PARTICULATE CONTAMINANTS IN PULP AND PAPER SLURRIES

(75) Inventors: Mark Laurint, Jacksonville, FL (US); Lloyd Lobo, Lincoln University, PA (US); Catherine Kelly, Claymont, DE (US)

(73) Assignee: Hercules Incorporated, Wilmington, DE (US)

( * ) Notice: Subject to any disclaimer, the term of this patent is extended or adjusted under 35 U.S.C. 154(b) by 719 days.

(21) Appl. No.: 12/276,655

(22) Filed: Nov. 24, 2008

(65) Prior Publication Data
US 2009/0141963 A1 Jun. 4, 2009

Related U.S. Application Data

(60) Provisional application No. 61/004,997, filed on Nov. 30, 2007.

(51) Int. Cl.
*G06K 9/00* (2006.01)
*D21F 7/06* (2006.01)
(52) U.S. Cl. .......................... 382/111; 382/275; 162/263
(58) Field of Classification Search .................. 382/100, 382/103, 106, 108, 112, 123, 141, 168, 173, 382/181, 232, 254–260, 274, 275–276, 286, 382/305, 312, 321, 111; 514/772.2; 162/4, 162/263; 356/335; 436/178; 73/86; 524/474
See application file for complete search history.

(56) References Cited

U.S. PATENT DOCUMENTS

| | | | | |
|---|---|---|---|---|
| 4,758,308 A * | 7/1988 | Carr | | 162/263 |
| 5,191,388 A * | 3/1993 | Kilham | | 356/335 |
| 5,646,338 A * | 7/1997 | Mercusot et al. | | 73/86 |
| 5,952,394 A * | 9/1999 | Nguyen | | 514/772.2 |
| 6,010,593 A * | 1/2000 | Eymin Petot Tourtollet et al. | | 162/4 |
| 6,090,905 A | 7/2000 | Juzukonis et al. | | |
| 6,150,452 A * | 11/2000 | Ling et al. | | 524/474 |
| 2002/0059998 A1 | 5/2002 | Glover et al. | | |
| 2005/0039873 A1 | 2/2005 | Curham et al. | | |
| 2006/0048908 A1 | 3/2006 | Wang et al. | | |

(Continued)

FOREIGN PATENT DOCUMENTS
EP 0 825 293 2/1998
(Continued)

OTHER PUBLICATIONS

R. Klein, "Deposition Behaviour of Stickies in the Papermaking Process" Wochenblatt Fuer Papierfabrikation, vol. 128, No. 8, 2000, pp. 516-523.

(Continued)

*Primary Examiner* — Seyed Azarian
(74) *Attorney, Agent, or Firm* — Joanne Mary Fobare Rossi; Robert O'Flynn O'Brien; Wei-Wen Yang

(57) ABSTRACT

A method and an apparatus for measuring the depositability of particulate contaminants present in a pulp or paper mill fluid stream and evaluating interactions of such particulate contaminants with other contaminants collects the particulate contaminants on a suitable substrate, such as a plastic film coated with an adhesive or coated with organic contaminate, placed in contact with the pulp or paper mill fluid stream for at least five minutes up to several hours. The amount of contaminants collected on the substrate is quantified and evaluated by taking one or more scanned images of the substrate with a resolution of at least 2,000 dots per inch (DPI) and analyzing the scanned images with image analysis technique.

22 Claims, 4 Drawing Sheets

U.S. PATENT DOCUMENTS

2006/0281191 A1* 12/2006 Duggirala et al. ............ 436/178

FOREIGN PATENT DOCUMENTS

| EP | 0 922 476 A1 | 6/1999 |
| EP | 1 217 121 | 6/2002 |
| WO | 2006/113896 | 10/2006 |

OTHER PUBLICATIONS

Doshi, M. R. etal., "Review of Quantification Methods for PSA and Other Stickies", 2000 Proceedings/2000 TAPPI Recycling Symposium, Mar. 5-8, 2000 Hyatt Crystal City, Washington, D. C., Mar. 5, 2000, p. 701-711.

J. Dyer, *A Summary of Stickies Quantification Methods* (Aug. 1997), pp. 44-51, Progress in Paper Recycling.

R. Blanco, et al., New System to Predict Deposits Due to DCM Destabilitization in Paper Mills (2000), pp. 40-43, Pul. & Paper Canada, 101(9).

K. Cathie, et al., Understanding the Fundamental Factors Influencing Stickies Formation and Deposition (1992), pp. 157-160, Pulp & Paper Canada, 93(12).

* cited by examiner

METHOD AND APPARATUS FOR MEASURING DEPOSITION OF PARTICULATE CONTAMINANTS IN PULP AND PAPER SLURRIES

CROSS-REFERENCE TO RELATED APPLICATION

This application claims priority to U.S. provisional application Ser. No. 61/004,997, filed Nov. 30, 2007.

FIELD OF THE INVENTION

The present invention relates to a method for measuring the depositability of particulate contaminants present in a pulp or paper mill fluid stream, and further helps to assess interactions of particulate contaminants with other contaminants that may be present in the pulp or paper mill fluid stream. In the method contaminants are collected on a suitable substrate and the amount of contaminants collected is quantified by analyzing the substrate via an image analysis technique with a resolution of at least 2,000 dots per inch ("DPI"). The method is also suitable for determining the effectiveness of deposition inhibition treatments for a pulp or paper mill fluid stream or in a liquid or slurry that simulates a pulp or paper mill fluid stream. The present invention further relates to apparatus for collecting particulate contaminants on the substrate.

BACKGROUND OF THE INVENTION

The deposition of organic contaminants (i.e., pitch and stickies) on equipment surfaces in the papermaking process is well known to be detrimental to both product quality and the efficiency of the papermaking process. Some contaminating components occur naturally in wood and are released during various pulping and papermaking processes. Two specific manifestations of this problem are referred to as pitch (primarily natural resins) and stickies (adhesives or coatings from recycled paper). Pitch and stickies have the potential to cause problems with deposition, quality, and efficiency in the papermaking process.

The term "pitch" herein refers to deposits composed of organic constituents that may originate from natural wood resins, their salts, as well as coating binders, sizing agents, and defoaming chemicals which may be found in the pulp. In addition, pitch frequently contains inorganic components, such as calcium carbonate, talc, clays, titanium and related materials.

"Stickies" is a term that has been increasingly used to describe deposits that occur in systems using recycled fibers. These deposits often contain the same materials found in "pitch" and also may contain adhesives, hot melts, waxes, and inks.

When organic contaminants, such as pitch and stickies, deposit on surfaces in papermaking, quality and operating efficiency of a pulp or paper mill may be impacted or reduced. Organic contaminants can deposit on process equipment in papermaking systems resulting in operational difficulties in the systems. When organic contaminants deposit on consistency regulators and other instrument probes, these components can be rendered unreliable or useless. Deposits on screens can reduce throughput and upset operation of the system. This deposition can occur not only on metal surfaces in the system, but also on plastic and synthetic surfaces, such as machine wires, felts, foils, Uhle boxes and head box components.

Historically, the subsets of the organic deposit problems, "pitch" and "stickies", have manifested themselves separately, and differently, and have been treated separately and distinctly. From a physical standpoint, "pitch" deposits usually have formed from microscopic particles of adhesive material (natural or man-made) in the stock that accumulate on papermaking or pulping equipment. These deposits readily can be found on stock chest walls, paper machine foils, Uhle boxes, paper machine wires, wet press felts, dryer felts, dryer cans, and calendar stacks. The difficulties related to these deposits include direct interference with the efficiency of the contaminated surface, leading to reduced production, as well as holes, dirt, and other sheet defects that reduce the quality and usefulness of the paper for operations that follow, like coating, converting or printing.

From a physical standpoint, "stickies" usually have been particles of visible or nearly visible size in the stock that originate from recycled fiber. These deposits tend to accumulate on many of the same surfaces on which "pitch" can be found and cause many of the same difficulties that "pitch" can cause. The most severe "stickies" related deposits, however, tend to be found on papermaking machine wires, wet felts, dryer felts and dryer cans.

Methods of preventing the build-up of deposits on the pulp and paper mill equipment and surfaces are of great importance to the industry The paper machines could be shut down for cleaning, but ceasing operation for cleaning is undesirable because of the consequential loss of productivity. Deposits also can result in poor product quality, which occurs when deposits break off and become incorporated in the sheet. Preventing deposition thus is greatly preferred where it can be practiced effectively.

In the past, stickies deposits and pitch deposits more typically have manifested themselves in different systems. This was true because mills usually used only virgin fiber or only recycled fiber, and did not mix these furnish slurries together. Often very different treatment chemicals and strategies were used to control these separate problems.

Current trends are for increased mandatory use of recycled fiber in all papermaking systems. This is resulting in a co-occurrence of stickies and pitch problems in a given mill. In addition, with increased recycling of fibers, the trend towards "microstickies", defined as stickies with a diameter less than 150 μm, is a growing concern. Microstickies, because of their small size and large surface area, present a greater tendency to deposit and/or agglomerate.

In order to establish the best means to treat or prevent such problems, it is desired to have a method that can predict likelihood of particulate contaminant deposition, and that can quantify its effects as well as the effects of the various potential treatments that may be implemented.

In order to determine the contaminant content in a pulp, methods that measure the deposition of organic contaminants on a specific substrate by gravimetric analysis have been used. U.S. Pat. No. 6,090,905 teaches a method wherein the weight differential of packaging foam, placed in stainless steel baffles, before and after exposure to pulp slurry is utilized to estimate the content of deposited stickies. European Pat. No. EP 0 922 475A1 discloses a device that accumulates deposit under a shear field brought about by a rotating disc.

A variation to the gravimetric methods to quantify deposition is the use of sensors that respond to the weight of the deposit. U.S. Pat. No. 5,646,338 teaches an apparatus that relates the amount of lateral deflection about a pivot of a cantilever probe to the build-up of deposit on the projection portion of said probe. U.S. Pat. Appl. Pub. No. 2006/0281191 A1 teaches the use of a Quartz crystal microbalance whose vibration frequency and amplitude is affected by the formation of deposits on the exposed side of the crystal.

A drawback with gravimetric methods of measuring deposition quantity is that the actual measurement has a high potential for variability because of the small weight of deposit on the substrate. Gravimetric methods also typically quantify the total amount of contaminant which may not correspond to the amount that is deposited. Sensors can also be problematic when they are introduced into high shear environments or where there are mechanical vibrations in the fluid. Consequently, these methods may not be able to characterize the efficacy of a deposition treatment program.

Methods to specifically quantify stickies in pulp are summarized by J. Dyer, "A Summary of Stickies Quantification Methods," *Progress in Paper Recycling*, pp. 44-51 (1997, August). These methods include image analysis techniques, such as that employed with the Pulmac MasterScreen (Pulmac International, Montpelier, Vt., USA) low consistency screening device designed to mechanically separate fibers from contaminants including stickies and shives. R. Blanco, et al., "New System to Predict Deposits due to DCM Destabilization in Paper Mills," *Pulp & Paper Canada*, 101(9), pp. 40-43 (2000), discloses a variation of the equipment disclosed in European Pat. No. EP 0 922 475A1 employing image analysis techniques. K. Cathie, et al., "Understanding the Fundamental Factors Influencing Stickies Formation and Deposition," *Pulp & Paper Canada*, 93(12) (1992), pp. 157-160, discloses a method wherein stickies deposition on forming wires is quantified by image analysis.

Some image analysis techniques do discriminate between different types of contaminants to quantify those which specifically results in deposition. However, they typically are not capable of quantifying microstickies. Improved methods and apparatus for collecting particulate contaminants, diagnosing stickies and pitch formation and evaluating effectiveness of prevention treatments continue to be sought.

SUMMARY OF THE INVENTION

In one aspect, a method for measuring the depositability of particulate contaminants present in a pulp or paper mill fluid stream includes collecting contaminants on a substrate, and then quantifying the amount of contaminants collected by analyzing the substrate via an image analysis technique with a resolution of at least 2,000 dots per inch ("DPI").

In a second aspect, a method for evaluating the efficacy of a pulp or paper mill deposition inhibition treatments includes collecting contaminants present in a pulp or paper mill fluid stream on a substrate, and then quantifying the amount of contaminants collected by analyzing the substrate via an image analysis technique with a resolution of at least 2,000 DPI, as stated for the first aspect. In the second aspect of the method, a deposition inhibition program is implemented, followed by remeasuring the amount of contaminants present in the pulp or paper mill fluid stream that collect on a substrate added to the pulp or paper mill fluid stream after the deposition inhibition treatment is initiated. The efficacy of a pulp or paper mill deposition inhibition treatment also may be evaluated by quantifying the amount of contaminants present in a liquid or slurry that simulates a pulp or paper mill fluid stream by collecting particulate contaminants on a substrate and then analyzing scanned images of the substrate via an image analysis technique with a resolution of at least 2,000 DPI. In response to the results of the image analysis, a deposition inhibition program may be implemented in the simulation liquid or slurry, and the particulate contamination may be re-measured thereafter by inserting a second substrate to collect particulate contaminants and for which the result (after deposition inhibition treatment) may be compared to the first result (before deposition inhibition treatment.

In a third aspect, an apparatus for in-line particulate contamination collection includes a sampling chamber with an inlet and an outlet into which is directed a portion of a stream of a pulp containing fluid or slurry or process water. A web of substrate is introduced into the sampling chamber and particulate contamination is collected onto at least one surface of the web. A motor or other drive means controls the speed of travel of the substrate web through the sampling chamber such that the substrate web remains in contact with the pulp containing fluid or slurry or process water for at least about five minutes. A rinsing device rinses the surface onto which particulate contamination has been collected, and a drying device dries the rinsed surface. A digital imaging system scans or photographs the dried surface. The imaging system quantifies the amount of contaminants collected by analyzing the substrate via an image analysis technique with a resolution of at least 2,000 dots per inch ("DPI").

BRIEF DESCRIPTION OF THE DRAWINGS

Other goals, advantageous features, and possible applications of the present invention are disclosed in the following description of the embodiments with reference to the following drawings.

DETAILED DESCRIPTION OF THE INVENTION

Figure 1:
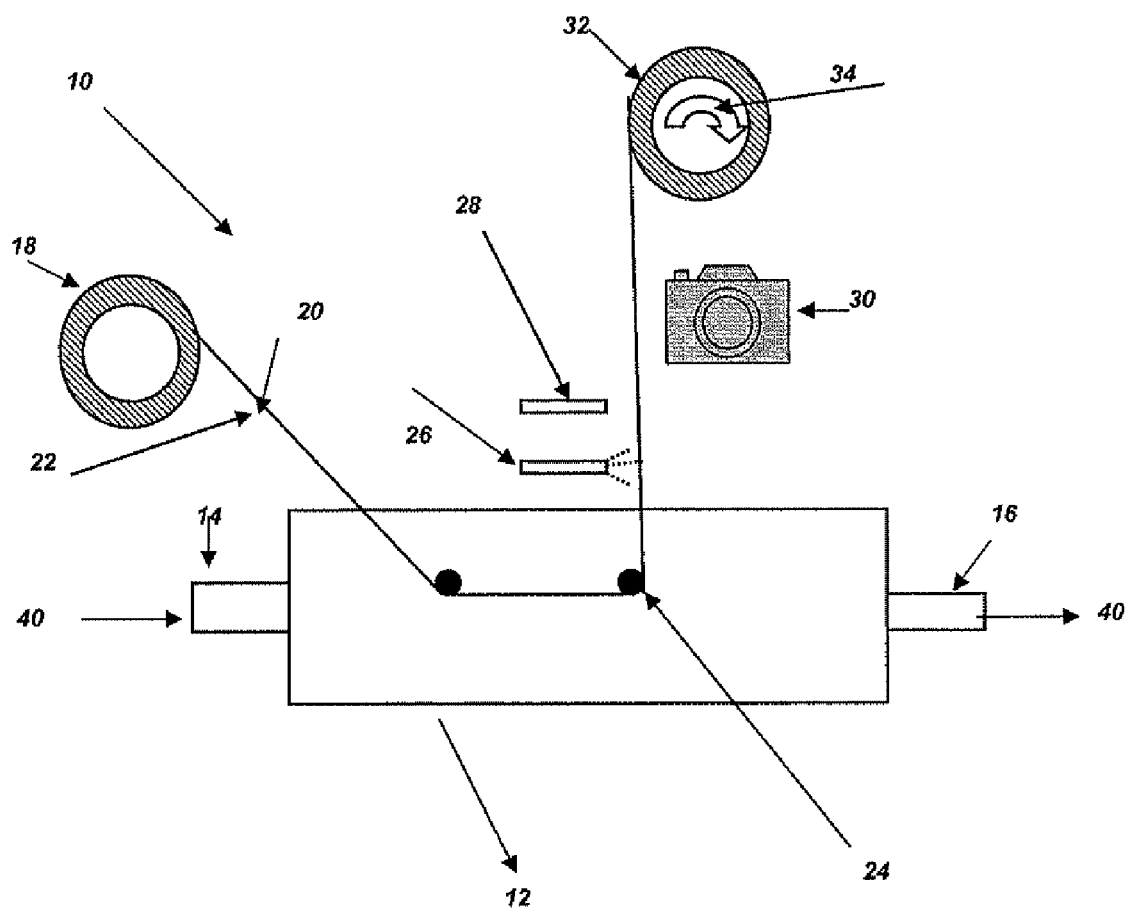
FIG. 1: A schematic diagram of an exemplary continuous in-line monitoring device for carrying out the method of the invention.

One embodiment of a method for measuring the depositability of particulate contaminants in paper and pulp mills comprises three steps: 1) inserting one or more suitable substrates into a fluid stream of interest (such as a paper-making furnish) onto which the particulate contaminant can deposit; 2) capturing one or more images of the deposited particles at a resolution of at least 2,000 dpi; and 3) counting and sizing the deposited particles. Optimally, the substrate onto which the particulate contaminant has been deposited is washed and dried before the image(s) are captured.

Suitable substrates on which the deposit may be collected include, but are not limited to, metals that represent machine surfaces; plastics or plastic films that represent forming wires and felts; surfaces of any generally liquid impermeable material that are coated with components of organic contaminants from recycle fiber sources; and surfaces of any generally liquid impermeable material that are coated with components of organic contaminants from virgin fiber surfaces. The latter two types of substrate surfaces simulate the growth of an already formed deposit in the presence of particulate contaminants.

Exemplary suitable plastic or plastic film substrates include, but are not limited to, polypropylene, polyethylene, PVC or PVDC, or polyesters, such as PEN or PET. Preferred are transparent plastic films which allow the passage of visible light. These plastic film substrates are generally liquid impermeable and may carry a coating thereon.

Exemplary suitable metal substrates include, but are not limited to, stainless steel or carbon steel. These metal substrates are generally liquid impermeable and may carry a coating thereon.

In a further aspect of the invention the suitable substrate can comprise a layer or film of similar or the same composition as the particulate component or other organic deposits. For example, a transparent plastic substrate coated with a non-water soluble adhesive, such as Scotch® brand transparent adhesive tape manufactured by 3M (St. Paul, Minn., USA), is a suitable substrate. A contaminant material, or a mixture of contaminant materials, can be used to form a film, preferably as a coating on one or more surfaces of a transparent substrate, by dissolving said contaminant material or materials in an appropriate volatile solvent and applying the solution uniformly to the substrate and subsequently evaporating the solvent. Said contaminants can include, but are not limited to, wood pitch, triglycerides, fatty acids, sterols, terpenoic acids, latexes and other organic materials intrinsic to wood used for papermaking. Other contaminant materials arising from recycled streams, such as coated broke, adhesives, inks, and the like, also are included as contaminant materials that can be used in preparation of the substrates.

In addition to contaminant materials, other materials of interest can be applied to the substrate as a film. These may include passivating materials or chemicals added as treatments to the pulp stream to improve product quality.

Different methods can be used to apply a film of material onto a substrate. If the material has a low viscosity, the film material can be applied with a brush or a blade. High viscosity fluids, pastes and solids can be dissolved or dispersed in a volatile solvent, and then applied to the substrate.

The ability of a particulate contaminant present in the pulp or paper mill fluid stream to adhere to a film of coated contaminant is an indication of (a) the attractive interaction between these contaminants and (b) the ability for deposition to start and for the deposits to grow.

One variation of coating the substrate in the method of the invention is to collect a deposit from one pulp or paper mill fluid stream onto a substrate. After characterizing the deposit from this first stream with an image analysis, the coated "dirty" substrate is introduced into a second pulp or paper mill fluid stream that may have a different set of contaminants. This is followed by a second image analysis. The deposition occurring on the dirty substrate in the second pulp or paper mill fluid stream is a measure of the interaction between contaminants in first and second pulp streams.

For offline or certain in-line monitoring, the substrates can be used as is or mounted on a holder to facilitate introduction to the pulp or paper mill fluid stream. For image scanning purposes, it is useful to mount the substrates on a 35 mm slide holder. The deposition step can be made by inserting the substrate in-line with a pulp or paper mill fluid stream, or by pulling out some furnish from the mill and running a stirred cell setup with the substrate in the cell. The substrate is left in the pulp or paper mill fluid stream or stirred cell for a desired amount of time to accumulate the deposit. The pulp stream of interest can be of any consistency that is of practical interest in the mill. It can also be carried out in the white water or other waste streams that can contain particulate deposits. In some instances it may be necessary or desirable to pull a side stream from the pulp or paper mill fluid stream in the papermaking process and dilute it appropriately.

Different methods by which to collect the deposit on the substrate are possible. In an offline embodiment of the deposit collection, a pulp sample that is believed to contain contaminants of interest is collected and put into a container. The substrates are suspended within the container, while the pulp is stirred vigorously for a desired deposition time. The pulp can be diluted appropriately to enable the stirring step. This method can also be used for simulated pulps and contaminants.

One on-line embodiment of the deposition measurement is carried out by contacting the substrate with a flowing pulp stream. A preferred method of accomplishing this is by diverting a small quantity of a flowing pulp stream using a sampling port and valve. The diverted pulp stream can be contacted with the substrate by anchoring it within a flow device, such as a pipe. The pulp is allowed to contact and flow past the substrate at an appropriate flow rate, such as to simulate the flow rate in the papermaking process, for the desired amount of time to collect particulate or contaminant deposit.

With any of the preferred methods of collecting the particulate or contaminant deposit, the deposition time can vary between a few seconds to several hours. However, we have found that in order to reduce the variability of the measurement, the deposition time should be at least five minutes.

After the deposition time is complete, the substrate is removed and thoroughly rinsed in water to wash away non-adhered material from the substrate. The substrate is dried and then subjected to image capture and analysis.

The measurement and analysis methods described above can also be used to create a continuous and automated in-line monitoring device 10, such as illustrated in FIG. 1. Referring to FIG. 1, the device 10 includes a sampling chamber 12 with an inlet 14 and an outlet 16. The inlet 14 may include a sidestream sample flow control (not shown in FIG. 1) to continuously allow the required amount of pulp represented by arrows 40 to flow into the sampling chamber 12. The substrate 20 is a continuous web onto which preferably an adhesive coating is present. In FIG. 1, an adhesive coated side 22 is shown. The substrate 20 or continuous web is fed from a supply spool or roll 18 into the sampling chamber 12. A series of rollers and pulleys 24 allow the substrate 20 to be threaded into and out of the sampling chamber 12 to a take-up spool or roll 32. The take-up roll 32 is driven by a motor 34, such as a step motor for example, that controls the speed of travel of the substrate 10 in the sampling chamber 12. The speed of the motor 34 is directly related to the desired residence time or time for deposition during which the substrate 10 is in contact with the sample pulp stream in the sampling chamber 12. Upon exiting the sampling chamber 12, the substrate 10 preferably is rinsed off with a water spray from a water jet or water nozzle 26, and then dried with an air spray from an air nozzle 28. The dried substrate is then imaged or photographed with a digital camera or scanner 30 fitted with an appropriate macro lens. The image is transmitted to the data acquisition system (not shown in FIG. 1), where an image analysis program is used to measure the deposition parameters such as those described in the Examples.

Whether using an offline or in-line particulate contamination deposit method, the substrate onto which the deposit is formed is imaged. The ideal method of image capture depends on the nature of the substrate. For non-transparent supports (e.g., metals and metal foils), a camera can be used to capture the image either directly or through a reflected light microscope. If the camera image is not digital, the image preferably is digitized using a scanner. For transparent substrates (e.g. transparent plastic films or tapes), a preferred method is a film/slide scanner which has a resolution of at least 2,000 DPI, although other types of high resolution scanners can also be used. 2,000 DPI corresponds to a pixel size of 12.7 µm. In order to have reasonable resolution of a single particle, its image should comprise at least four pixels, which translates to an equivalent size of 25 µm×25 µm. A resolution lower than 2000 DPI would increase the minimum resolved stickie size, and information on smaller stickies might be missed. A lower resolution would not be able to distinguish the small sized particulate contaminants characteristic of "microstickies". To capture smaller-sized particles, images may be taken through a microscope, in which case several images may be needed to represent the whole of the substrate. In some instances the particles may not be optically distinct and their detectability can be enhanced by functionalizing the deposits and using an appropriate scanner.

Once the image or series of images is captured, the size and number of particles can be can be characterized by different methods. One method is to count manually, but manual counting is very tedious.

There are several image processing software packages available in the market that can identify particles in a flat optical field. One image analysis software program is Verity IA (Verity IA LLC, Oshkosh, Wis., USA). Another is Image-Pro (Media Cybernetics, Bethesda, Md., USA). By identifying pixels that are of different intensity than the majority of the pixels, and then by grouping adjacent pixels of the different intensity, the software is able to define the outline of a particle. Once the outlines of individual particles are defined, the software can count and size each particle. Thus, one would arrive at the total number of particles deposited on the substrate, as well as the size distribution of the particles deposited. Furthermore, size and shape filters in the image processing software can be employed to ignore particles that are very large or that have a high aspect ratio, such as cellulose fibers expected to be present in the pulp stream. As a matter of comparison between good and bad samples, different parameters can be defined to capture the quantity and quality of the deposit. One parameter is the number of particles that are deposited. Because of the potential of agglomerated particles being deposited, another useful metric is the fraction of the area that the particles cover the substrate. However, any geometric property that quantifies the deposit can be used.

To get a deposition that is statistically representative of the deposition over the whole substrate, the image can be divided into more than one area of interest ("AOI"). The particle count can be performed within each area, and areas that have abnormally high or abnormally low counts can be discarded. The average count in the remaining areas then can be obtained. Additionally, a number of substrate collection devices can be placed in the pulp or paper mill fluid stream at the same time to provide a statistical quantification of amount of deposited particulate contaminants.

The present invention will now be further described with reference to a number of specific examples that are to be regarded solely as illustrative and not restricting the scope of the present invention.

EXAMPLES

Example 1

A sorted office waste ("SOW") from a recycle pulp mill with a dichloromethane ("DCM") extractable level of 7 gm/Kg, and a bleached hardwood Kraft pulp with no detectable DCM, were both diluted to 0.5% consistency at 200 ppm. Calcium was added in the form of calcium chloride. The two slurries were then mixed in various ratios (see Table 1 below) and added to a beaker equipped with a magnetic stirrer and heater. The slurry mixtures were then heated to 50° C. with mixing. Two 35 mm photographic slide holders to which 3M adhesive tape 175-O (3M, St. Paul, Minn., USA) was mounted as the substrate were then suspended in the slurry for a period of one hour. The slides were mounted in such a fashion that the orientation of the substrate was parallel with flow of the slurry. After the hour of residence time, the slides were removed from the heated slurry, rinsed with cold water, and then air dried in a dust free environment. Each slide was then scanned utilizing a Nikon CoolScan V ED (Nikon USA, San Diego, Calif., USA) at 4,000 DPI with the dirt elimination option disabled. The scanned images were stored in a jpeg format.

Verity IA (Verity IA, LLC., Oshkosh, Wis., USA) image analysis software was used to count and size the particles. Pixels with an intensity value (value ranges from 0-256) 60 units lower than that of the clear background were considered to be counted. The software automatically grouped such pixels when they were adjacent to each other to define a particle. Two qualifiers were used to eliminate particles once they were defined: (1) any particles whose area was less than 0.001 sq. mm or greater than 1.2 sq. mm were removed from the collection; and (2) any particles that had a circularity greater than 30 as defined by Equation 1 (below). These qualifiers eliminated most of the cellulose fibers that may have been left behind on the substrates.

$$\text{circularity} = \frac{[\text{circumference}]^2}{\text{area}} \quad \text{Equation 1}$$

Three areas of interest ("AOI") were selected from each 36×24 mm substrate and analyzed for particles within the parameters defined. Within each area, the percent area occupied by the deposited particles was calculated and an average percent area between the three AOIs was reported, along with standard deviation from three measurements. The results of this analysis are summarized in Table 1.

TABLE 1

| % SOW Pulp in Total | % Area Occupied by Deposit | Standard Deviation |
| --- | --- | --- |
| 1% | 0.2048 | 0.0610 |
| 5% | 0.4232 | 0.0728 |
| 10% | 0.5722 | 0.0577 |
| 25% | 1.1300 | 0.1329 |
| 50% | 1.1962 | 0.1101 |
| 75% | 1.7862 | 0.2383 |
| 100% | 2.3365 | 0.0266 |

The measurements show that with increasing recycle SOW furnish (i.e., increasing stickies content) in the SOW/Kraft pulp slurry, the calculated % Area Occupied by Deposit value also increased.

Example 2

Figure 2:
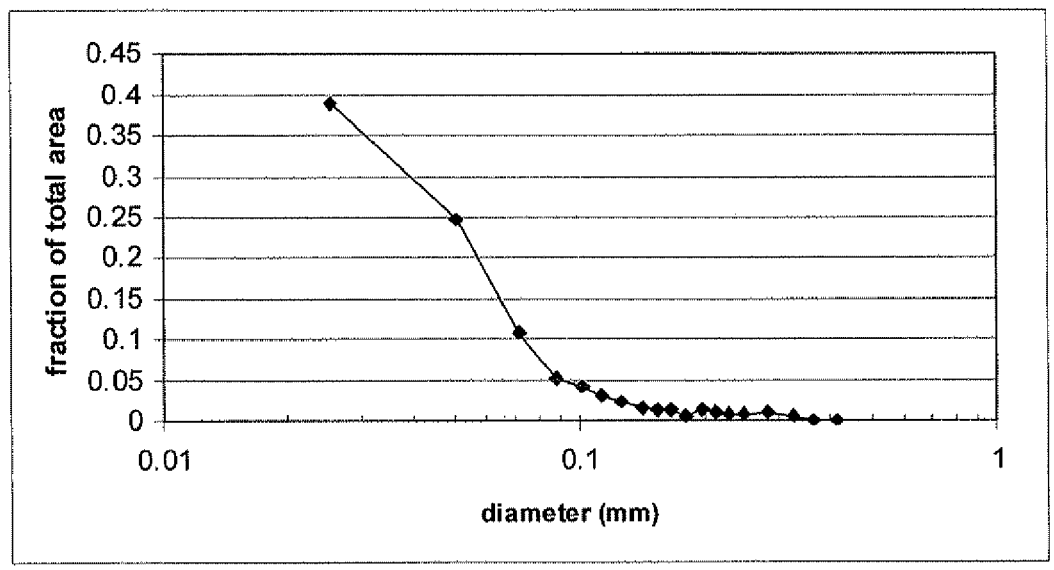
FIG. 2: A plot of contaminant particle size versus fraction of total area for a pulp slurry.

The 75% SOW/25% bleached hardwood Kraft pulp data from Example 1 was analyzed for particle size distribution. A plot of the frequency distribution of the deposited particles versus particle size is presented in FIG. 2. In this example, it can be seen that a majority of the area of the deposit is due to microstickies, and particles as small as 20 μm were detected.

Example 3

Figure 3:
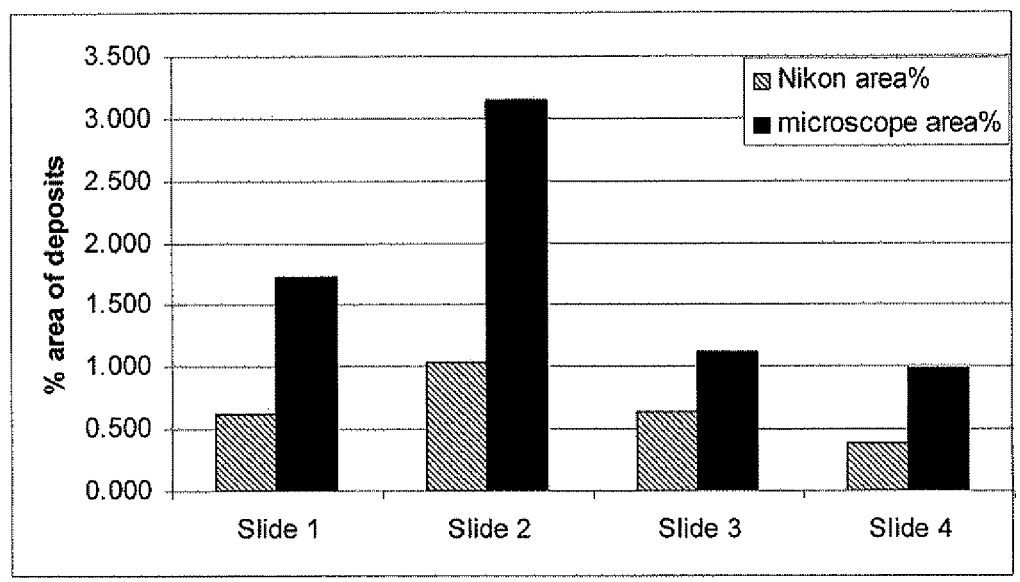
FIG. 3: Comparison of % area occupied by deposit results for images obtained with a scanner at a resolution of 4,000 DPI and a microscope at 65× magnification.

Example 1 was repeated with 100% SOW under four different conditions varying temperature and deposition time as noted in Table 2 (below). Images were generated with the Nikon CoolScan V ED scanner as noted in Example 1 and with a transmitted light microscope at 65× magnification. For the transmitted light microscope, sixteen images were obtained per slide. The images from all the slides were analyzed using the Verity IA software, and the results were averaged for each data set. A summary of this analysis is presented in FIG. 3. The microscope images detected a greater number of deposited particles of very small particle size that were not detected by the scanner. While the absolute values for the microscope images are greater than Nikon CoolScan V ED for a given data set, the overall trends between the various slides are consistent. This further demonstrates that the particulate contaminants in this pulp furnish consist of a significant amount of microstickies.

TABLE 2

| Slide # | Time min | Temp C. |
|---------|----------|---------|
| 1 | 10 | 50 |
| 2 | 30 | 50 |
| 3 | 60 | 50 |
| 4 | 60 | 65 |

Example 4

The SOW recycle pulp was blended with the Bleached hardwood pulp to create four pulps with different recycle content (10%, 25%, 50% and 100%). Each of these pulps was diluted to 0.5% consistency and the deposition test was run on them, as described in Example 1. For each of the pulps, four separate tests were run, with each test containing different doses of a treatment chemical. The treatment chemical used in this experiment was 88% hydrolyzed polyvinyl alcohol and the dosages used were 0,2 ppm, 5 ppm and 10 ppm based on the total pulp. The image generation and data analysis was carried out as described in Example 1. The % area deposited on each of the substrates was calculated and the data is plotted in FIG. 4.

Figure 4:
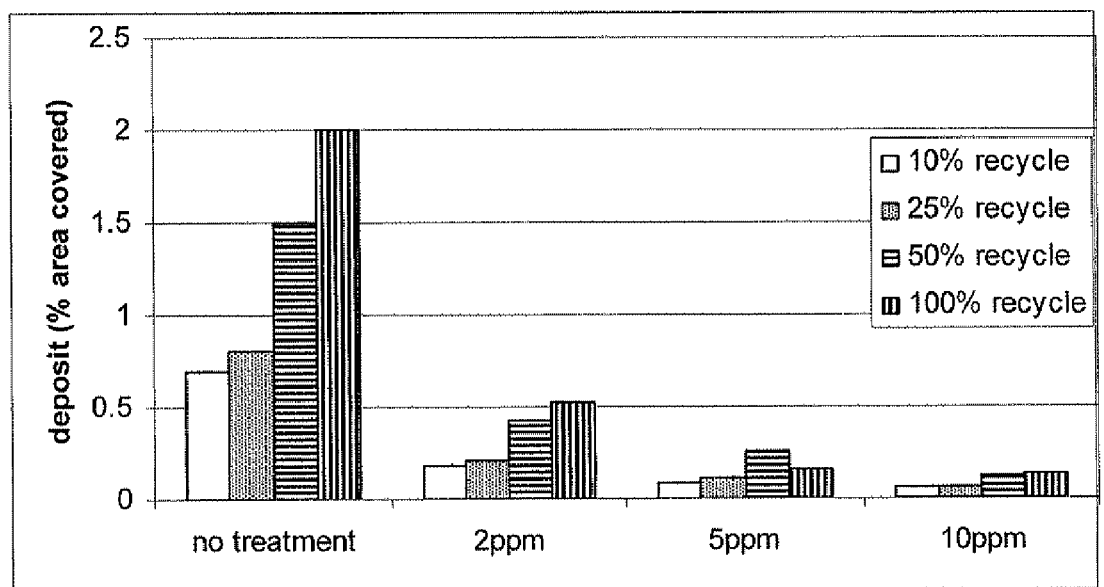
FIG. 4: Comparison of % area occupied by deposit results for particulate contamination of substrates for differing pulp concentration before and after deposition inhibition treatment added to pulp.

Referring to FIG. 4, we observed that (i) as the treatment level was increased, the particulate contaminant deposition for all pulps decreased, and (ii) when the recycle content of the pulp was lower, lower doses of treatment chemical were needed to reduce the particulate deposition.

Example 5

A synthetic pitch composition comprising 20 wt % Pamak TP (Eastman Chemical Company, Kingsport, Tenn., USA), 30 wt % Sylvatol 40 (Arizona Chemical, Jacksonville, Fla., USA), and 50 wt % abietic acid (Aldrich Chemical Company, Milwaukee, Wis., USA) was diluted to various levels in acetone (see Table 3). A polypropylene substrate mounted to a 35 mm slide holder was then dipped into the solutions and allowed to air dry. The amount of pitch deposited on the slides was quantified by UV absorbance at 210 nm. The slides were then utilized as the substrates according to Example 1 with 100% SOW.

TABLE 3

| Pitch Solution Concentration | abs 210 nm | % Area Occupied by Deposit |
|---|---|---|
| 27.00% | >3 | 6.605 |
| 13.50% | 3.1 | 4.5515 |
| 6.75% | 2.8 | 2.7855 |
| 3.38% | 1.4 | 1.564833 |
| 1.69% | 0.7 | 0.568333 |

The uncoated polypropylene substrate itself does not cause deposits. It was observed that as the pitch coating became thicker, based on the absorbance at 210 nm, the % areas of the deposit increased. As such, the increase in deposits observed in the example results from the interaction of the recycle particulate contaminants and the coated pitch. This example also demonstrated that non-particulate contaminants, such as pitch, could be quantified by analyzing a suitable transparent substrate by UV absorption techniques.

Example 6

Figure 5:
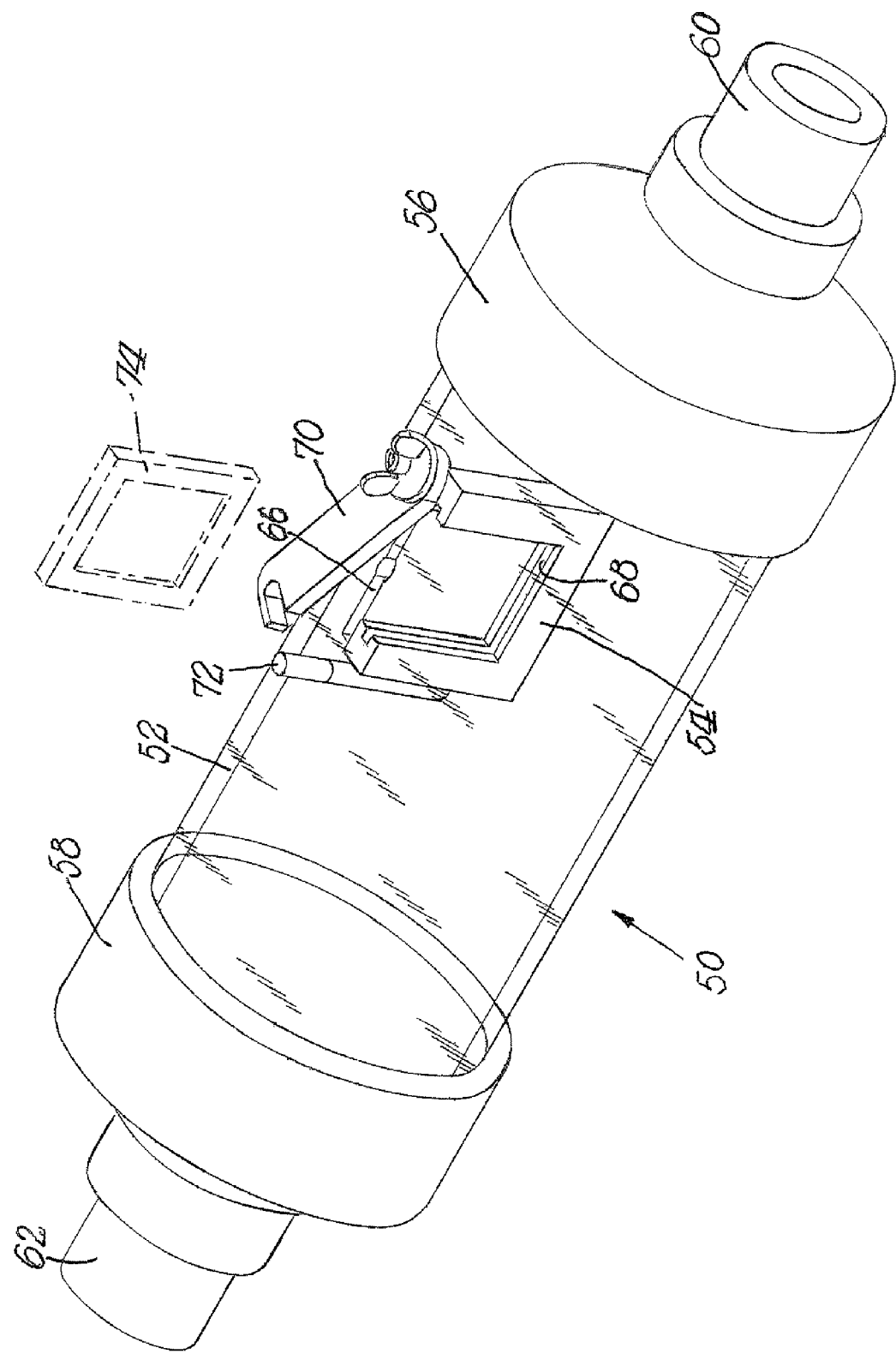
FIG. 5: A schematic diagram of an alternative exemplary in-line monitoring device for carrying out the method of the invention.

FIG. 5 shows an alternative on line sampling device 50 that was fabricated using a 12" acrylic tube 52. A rectangular stainless steel frame 54 that is capable of mounting the 35 mm photographic slide holders with the adhesive tape 74, as described in Example 1 was screwed into the wall of the tube 52 and oriented such that the planes of the slides held by the frame 54 are in the same direction as the length of the tube 52. The ends of the 12" long acrylic tube 52 were capped with flexible reducer couplings 56, 58 with a quick disconnect 60, 62 that connects to one end of a hose (not shown in FIG. 5).

The free end of the hose (not shown in FIG. 5) was connected to a sampling port on the discharge of the machine chest of a recycle newsprint mill. This was the last storage tank before the pulp got diluted at the fan pump and entered the headbox. Two 35 mm slides were inserted through a slot 66 formed in the tube 52, such that they entered the holding slots or grooves 68 formed in the stainless steel frame 54. The adhesive sides of the substrates were facing outwards, i.e. towards the pulp stream. Cover 70 was pivotally closed over the slot 66 and engaged at one end to pin 72. The sampling valve on the pulp line was opened such that about 5 Kg/min of pulp was flowing through the tube. After five minutes of pulp flowing, the valve was switched off and the slides were removed and rinsed off.

The procedure for scanning and analysis was similar to the one described in Example 1. Five samples were taken and averaged.

Different levels of a contaminant control agent (a 20% whey protein solution) were added to the deink pulp which was then flowed through the tube on the discharge of the deink chest. Five samples were taken at each dosage level. The measurements from each set of five were then averaged. The results of those measurements are shown in Table 4:

TABLE 4

| Dosage lbs/Ton | deposition % area |
|---|---|
| 0 | 1.634 |
| 1 | 1.393 |
| 3 | 1.160 |
| 5 | 1.061 |

It is observed that the particulate contaminant deposit amount reduces with increasing dosage of the contaminant control agent. Thus, this test and on line sampling device could be used to validate the response of certain treatment chemicals, as well as to study the dosage response of the treatment.

As seen from the above examples, the techniques described herein can both measure the deposition of particulate contaminants and help to quantify the size and size distribution of the deposited contaminants. Because the deposition of particulate contaminants can be measured on films prepared with the same or different contaminants, the inventive methods permit one to assess and measure interactions between specific contaminants and the accumulation of particulate deposits on a previously deposited contaminant film that is present in a production environment.

While the present invention has been described with respect to particular embodiments thereof, it is apparent that numerous other forms and modifications will be obvious to those skilled in the art. The appended claims and this invention generally should be construed to cover all such obvious forms and modifications, which are within the true scope of the invention.

The invention claimed is:

1. A method for measuring the depositability of particulate contaminants in pulp and paper systems, comprising the following steps:
   a. inserting a substrate into a pulp containing fluid or slurry or process water;
   b. allowing the substrate to contact the pulp containing fluid or slurry or process water for a desired time;
   c. capturing with an imaging system with a minimum resolution of 25 microns major dimension or less one or more images of particles deposited on the substrate after the substrate is removed from the pulp containing fluid or slurry or process water; and
   d. analyzing the one or more images to count and size deposited particles on the substrate; and
   e. adding a deposition inhibition treatment to the pulp containing fluid or slurry or process water.

2. The method of claim 1, further comprising washing and drying the substrate before capturing the one or more images.

3. The method of claim 1, wherein the substrate is inserted into continuously flowing pulp containing fluid or slurry or process water.

4. The method of claim 1 wherein the particulate contaminants comprise inks, latices, adhesives, organic fillers, pitch, and combinations thereof.

5. The method of claim 1, further comprising treating the pulp containing fluid or slurry or process water by chemical functionalization, including pH or ionic strength adjustment, dyes, UV treatment, or other chemical modifications in order to enhance detection of the organic deposit for counting and sizing.

6. The method of claim 1 wherein the substrate comprises polypropylene, polyethylene, polyvinyl chloride, PVDC, polyesters, or other polymeric films.

7. The method of claim 1, wherein the substrate is coated with a contaminant before insertion into the pulp containing fluid or slurry or process water.

8. The method of claim 7, wherein a coating of an organic contaminant and a solvent is applied to the substrate.

9. The method of claim 1, wherein the substrate is coated with a contaminant before insertion into the pulp containing fluid or slurry or process water by first inserting the substrate into a different pulp containing fluid or slurry or process water.

10. The method of claim 1 wherein the substrate comprises a metal or metallic alloy.

11. The method of claim 1 wherein the one or more images are captured using an optical scanner, digital or film photography, or digital or film photography through a reflected-light microscope.

12. The method of claim 1 wherein the counting and sizing of the deposited particles is with image analysis software.

13. The method of claim 1, further comprising:
   f. inserting a second substrate onto which to collect particulate contaminants after the deposition inhibition treatment was added;
   g. capturing one or more images of the second substrate; and
   h. analyzing the one or more images to count and size deposited particles on the second substrate.

14. An apparatus for in-line particulate contamination collection, comprising:
   a. a sampling chamber with an inlet and an outlet into which is directed a portion of a stream of a pulp containing fluid or slurry or process water;
   b. a web of substrate that is introduced into the sampling chamber and onto at least one surface of which web particulate contamination is collected;
   c. a motor or other drive means to control the speed of travel of the substrate web through the sampling chamber such that the substrate web remains in contact with the pulp containing fluid or slurry or process water for at least about five minutes;
   d. a rinsing device to rinse the surface onto which particulate contaminants have been collected;
   e. a drying device to dry the rinsed surface; and
   f. a digital imaging system with a minimum resolution of 25 microns major dimension or less to scan or photograph the dried surface.

15. The apparatus of claim 14, wherein the particulate contaminants comprise inks, latices, adhesives, organic fillers, pitch, and combinations thereof.

16. The apparatus of claim 14, wherein the substrate comprises polypropylene, polyethylene, polyvinyl chloride, PVDC, polyesters, or other polymeric films.

17. The apparatus of claim 14, wherein the substrate is coated with a contaminant before insertion into the pulp containing fluid or slurry or process water.

18. The apparatus of claim 17, wherein a coating of an organic contaminant and a solvent is applied to the substrate.

19. The apparatus of claim 14, wherein the substrate is coated with a contaminant before insertion into the pulp containing fluid or slurry or process water by first inserting the substrate into a different pulp containing fluid or slurry or process water.

20. The apparatus of claim 14, wherein the substrate comprises a metal or metallic alloy.

21. The apparatus of claim 14, wherein the digital imaging system captures one or more images with an image resolution of at least 2000 dots per inch using an optical scanner, digital or film photography, or digital or film photography through a reflected-light microscope.

22. The apparatus of claim 14, wherein the digital imaging system includes image analysis software for counting and sizing of the deposited particles.

* * * * *